Jan. 21, 1969    R. T. HEADRICK    3,422,838
HOSE REEL
Filed Sept. 28, 1965    Sheet 1 of 4
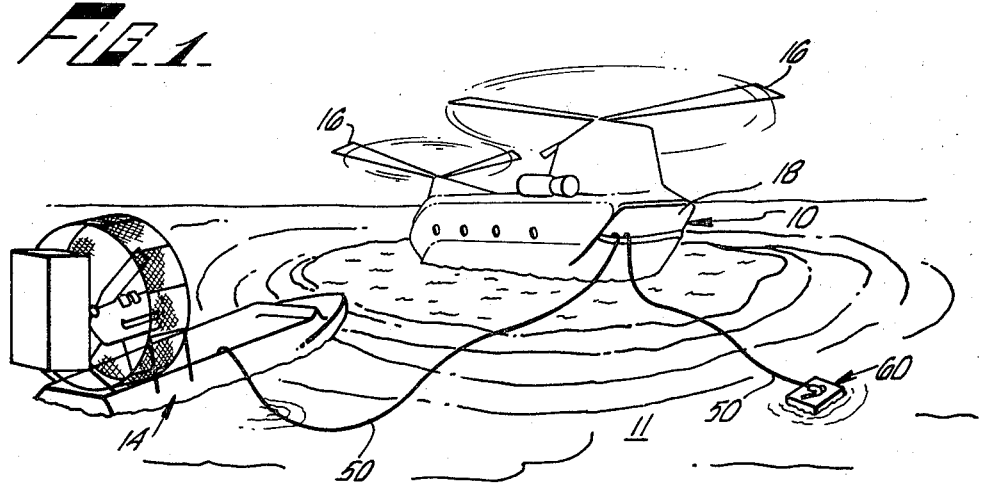
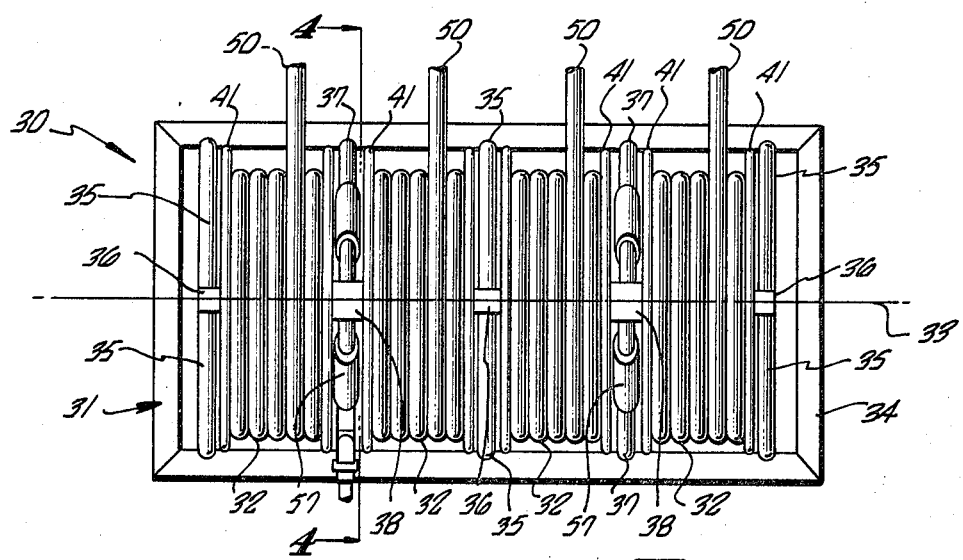
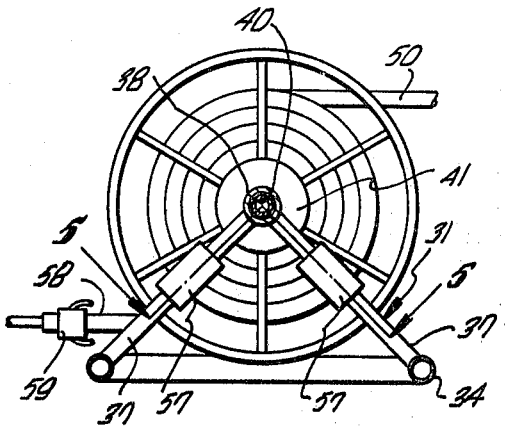
INVENTOR.
RICHARD T. HEADRICK
BY
Christie, Parker & Hale
ATTORNEYS.

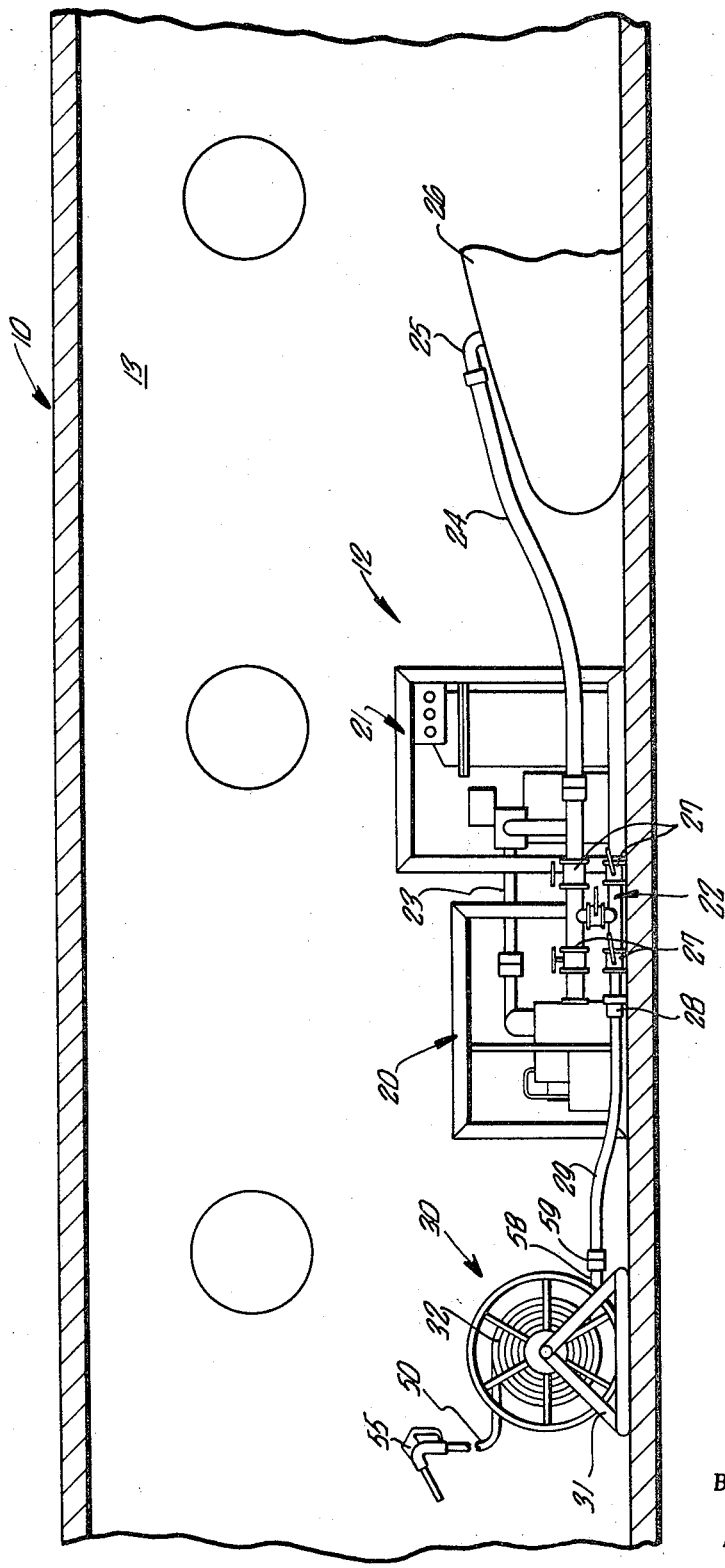

INVENTOR.
RICHARD T. HEADRICK

United States Patent Office 3,422,838
Patented Jan. 21, 1969

3,422,838
HOSE REEL
Richard T. Headrick, 916 Crestfield Ave.,
Duarte, Calif. 91010
Filed Sept. 28, 1965, Ser. No. 490,851
U.S. Cl. 137—355.12          8 Claims
Int. Cl. B60p 3/22; B64d 1/18

ABSTRACT OF THE DISCLOSURE

A hose reel assembly including a plurality of hose reels each including a liquid flow fitting adapted to be coupled to a hose. The reels are supported on a sled-type wheelless ground engaging framework which mounts the reels for rotation relative to each other. The structure of the framework provides a manifold for ducting liquid to the reels from a single inlet to a fluid flow path defined within the framework. A fluid flowrate control device is provided for each reel.

---

This invention relates to liquid handling and, more particularly, to a portable reel assembly for liquid transfer hoses.

My prior United States Patent 3,169,667 describes a fuel/defuel system which is useful by the military, for example, in supplying fuel to helicopters, to artillery spotting and reconnaissance aircraft, and to ground vehicles in support of "brush fire" engagements and anti-guerilla warfare. A modularized fuel/defuel system in accord with this patent is especially useful for such purposes since it can be transported easily and rapidly in a helicopter, thereby adapting the helicopter for use as a flying fuel tanker.

The system described in Patent 3,169,667 provides apparatus for filtering solid particles and water from fuel and for metering the quantity of filtered fuel passed through the system from a fuel storage tank connected to the system inlet and one or more fuel receptacles (such as aircraft fuel tanks) connected to the system outlet. Without the benefits provided by the present invention, the system outlet is connected to several fuel transfer hoses by a manifold system comprised of hoses, valves and Y-fittings laid out on the ground. Obviously such a manifold system and connect it to the fuel/defuel apparatus.

In the past, fuel hoses were laid on the surface of the ground to connect the fuel/defuel system to the vehicle being fueled. If two or more vehicles were to be fueled simultaneously, it was first necessary to assemble a manifold system and connect it to the fuel/defuel apparatus. Then the fuel transfer hoses had to be removed from their storage racks, connected to the manifold system, and run out to the vehicles to be fueled. In many cases, such a procedure was too time consuming for military needs. Also, because the existing procedures require that the hoses be carried to the vehicles to be fueled, such a procedure cannot be used where the fuel/defuel apparatus itself is located in an amphibious helicopter floating in water. As a result, the full advantages of fuel/defuel apparatus according to my prior patent have not been fully realized.

This invention provides a portable hose reel assembly which is especially useful with fuel/defuel apparatus in accord with my prior patent. The assembly provides means for storing and reeling several lengths of fuel hose. The assembly also includes a fuel manifold system which is continuously connected to the reels for the several hoses. Thus, only one fuel conduit need be connected from the fuel/defuel apparatus to the hose reel assembly to supply fuel to all the hoses carried in the reel assembly. The hoses are stored on the reel assembly when the assembly is not being used in fuel transfer operations. Further, the hoses need not be completely run out from the reels before a fuel transfer operation may be commenced. Moreover, the reel assembly provides the feature that the hoses may be rapidly disconnected from their reels if, during a fuel transfer operation, it becomes imperative that a helicopter in which the assembly is located leave the scene of fuel transfer operations with all due haste, as when the helicopter is under attack by hostile forces, for example.

This invention also provides a method, and novel structure for implementation of the method, whereby full use of an amphibious helicopter can be made as a flying tanker. The method provides a novel procedure for paying-out hoses from the hose reel assembly to vehicles to be fueled when the helicopter is floating on water; existing hose pay-out procedures cannot be used in such a situation.

Generally speaking, this invention provides a hose reel assembly including a plurality of hose reels. Each hose reel includes a liquid flow fitting adapted to be coupled to a hose. The assembly also includes reel support means mounting the reels for rotation relative to each other. The reel support means includes means defining a liquid flow path communicating between an inlet to the path and each fitting. Each fitting defines an outlet from the path. The assembly further includes flowrate control means for each outlet disposed in the flow path. The flowrate control means limits to a selected rate the flow of liquid along the path to each outlet.

The above mentioned and other features of this invention are more fully set forth in the following description of a presently preferred embodiment of the invention, which description is presented with reference to the accompanying drawings wherein:

FIG. 1 is a perspective view of an amphibious helicopter equipped with a hose reel assembly according to this invention and carrying out fuel transfer operations while floating on a body of water;

FIG. 2 is an elevation view of the interior of the helicopter showing a fuel/defuel apparatus and a hose reel assembly;

FIG. 3 is a top plan view of the hose reel assembly shown in FIG. 2;

FIG. 4 is a cross-sectional elevation view taken along lines 4—4 of FIG. 3;

Figure 5:
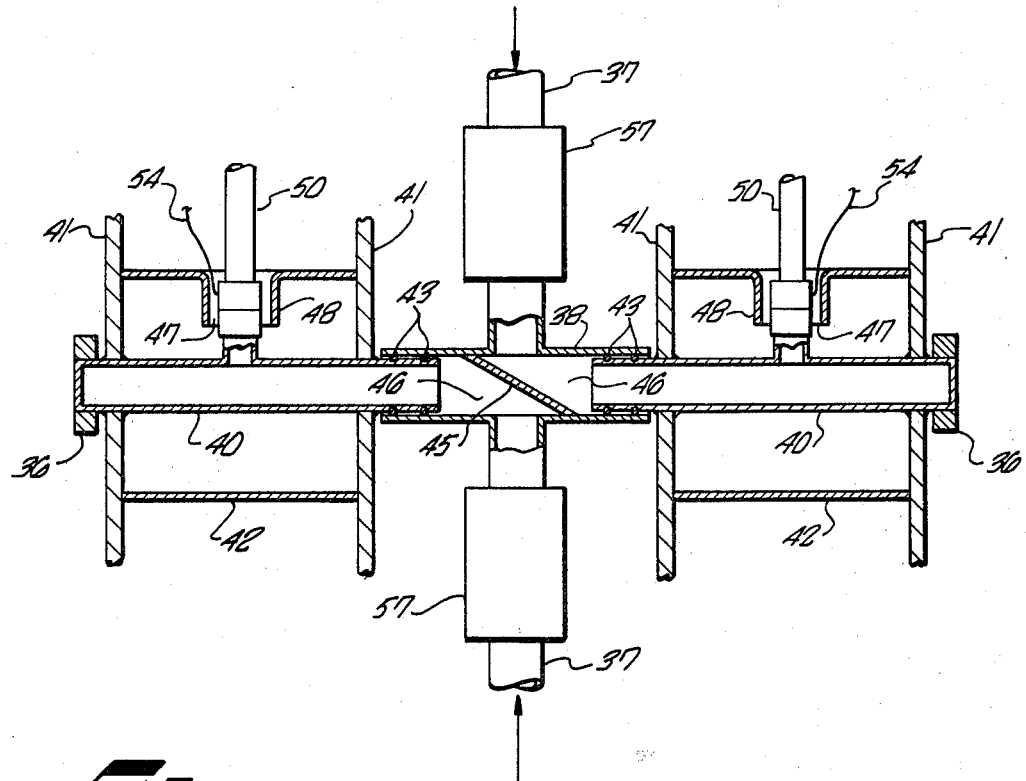
FIG. 5 is a cross-section view, with parts moved out of their normal relation for the purposes of illustration, of the hose reel assembly shown in FIGS. 2–4.

FIG. 1 shows a Chinook-type amphibious cargo and transport helicopter 10 floating on a body of water 11. The helicopter is equipped with a modularized fuel/defuel system 12 (see FIG. 2) in its cargo hold 13. The helicopter is engaged in fueling an air-boat 14 which floats on the water adjacent the rear of the helicopter outside an area of downwash 15 produced by the rotating helicopter rotors 16. A fuel transfer hose 50 extends through an open rear bay 18 of the helicopter across the surface of the water to the air-boat.

The fuel/defuel system located inside the helicopter (as shown in FIG. 2) is in accord with United States Patent 3,169,667 and includes a pump/motor module 20, a filter/meter module 21, and a fuel/defuel valve assembly 22. The pump/motor and filter/meter modules are interconnected by a fuel duct or hose 23. A fuel hose 24 is connected from the fuel/defuel valve assembly to a fuel outlet fitting 25 of a pillow tank 26. The pillow tank is fabricated of rubberized fabric and is collapsible into a small volume when empty. The valve assembly includes a plurality of valves 27 which, as shown in FIG. 2, are disposed in such condition that fuel from the pillow tank flows through the pump/motor module, through hose 23, through the filter/meter module, back into the valve assembly and from a valve assembly outlet 28. A fuel transfer hose or conduit 29 is connected between the fuel/defuel valve assembly outlet and a novel hose reel assembly 30.

As shown in FIGS. 2–6, the hose reel assembly includes a ground engaging frame or base 31 and a plurality of hose reels 32 mounted to the frame for rotation about a common horizontal axis 33. The reel assembly shown incorporates four hose reels. The frame is fabricated of pipe and has a rectangular ground engaging portion 34 disposed centrally below axis 33 and aligned with the axis. The pipes which form the ground engaging portion of the frame define a rectangular liquid flow path therein. Adjacent each end of the frame and at the midlength of the frame, a pair of pipes 35 extend upwardly from opposite edges of the frame ground engaging portion toward axis 33. The pipes of each pair converge toward each other at the axis and are connected at their upper ends to a reel shaft journal bearing 36 (see FIGS. 3 and 5). Journal bearings 36 are aligned along axis 33. Pipes 35 are not in communication with the liquid flow path in the ground engaging portion of the frame.

A pair of converging pipes 37 extend upwardly from opposite locations of the frame ground engaging portion toward the axis midway between adjacent pairs of pipes 35. At their upper ends, the pipes of each pair are secured to an open-ended hollow sleeve 38; the sleeves are aligned with each other along axis 33. Each of pipes 37 communicates between the interior of a sleeve 38 and the liquid flow path in the ground engaging portion of the frame.

Figure 6:
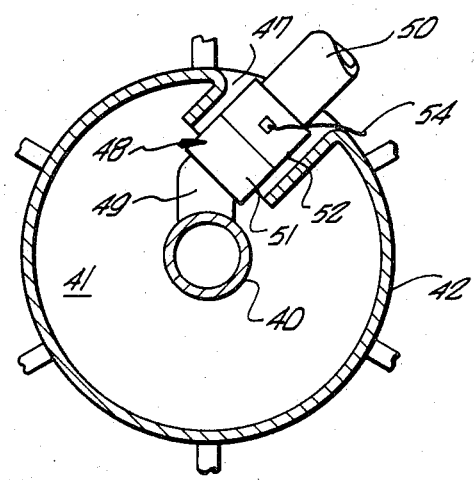
FIG. 6 is a cross-section view taken along line 6—6 of FIG. 5.

As shown best in FIGS. 3, 5, and 6, each hose reel 32 includes a rigid, hollow axial duct 40, a pair of spaced radial end plates 41 secured to the axial duct, and a hose coiling drum 42 spaced concentric to the axial duct and secured between the reel end plates. The end plates are spoked radially outwardly of the drums. Each axial duct has a closed end rotatably mounted in one of journal bearings 36. The other end of each axial duct is open and is rotatably received in an adjacent end of one of sleeves 38. A plurality of liquid-tight seals 43 are engaged between the exterior of each reel axial duct and the interior of the adjacent sleeve, as shown in FIG. 5.

A partition 45 extends obliquely across the interior of each sleeve 38 to divide the interior of the sleeve into oppositely opening chambers 46. The partition is centered between the openings of pipes 37 to the sleeve. Thus, each of the reel axial ducts communicates with the liquid flow path in the ground engaging portion of the frame via a separate one of pipes 37.

Each reel drum defines an opening 47 through it to communicate the interior and the exterior of the drum. A liquid flow fitting 48 is disposed in the annular space between each drum and reel axial duct in such a position to be accessible from the exterior of the drum through the opening. Each fitting is in liquid flow communication with the adjacent axial duct via a nipple 49 and is adapted for connection to one end of a fuel transfer hose 50 coiled around the exterior of the drum between the reel end plates.

Figure 7:
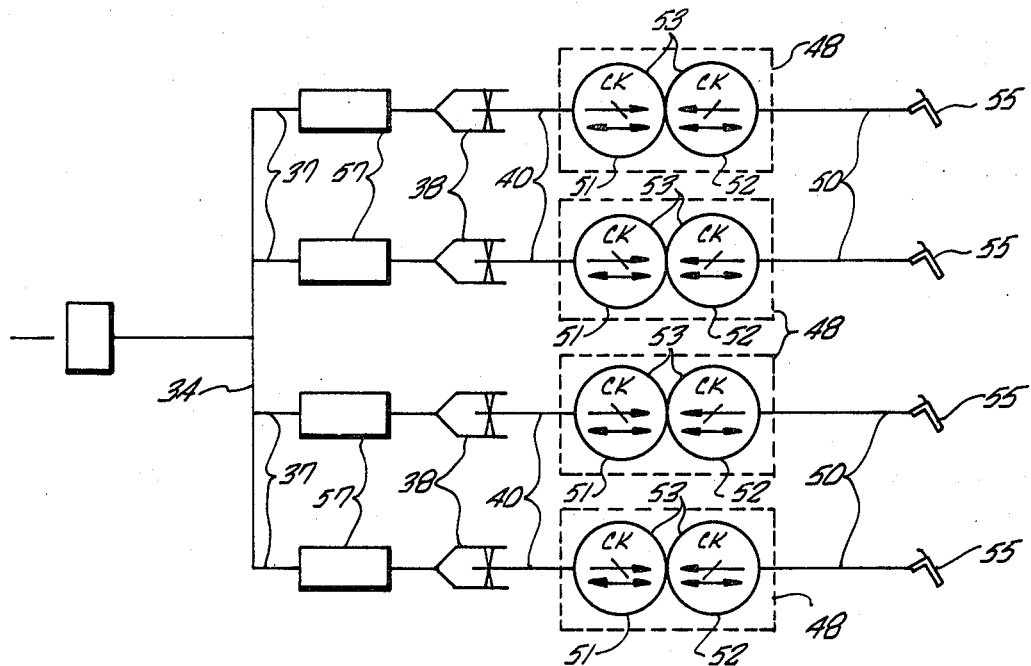
FIG. 7 is a schematic diagram of the liquid flow characteristics of the hose reel assembly.

Each fitting 48 is comprised of two cooperating parts 51 and 52 (see FIG. 6); part 51 is mounted to nipple 49 and part 52 is carried by the hose. The two parts of the fitting are releasably engageable with each other. Each half of the fitting, as shown in FIG. 7, includes a valve 53. When the fitting parts are engaged, the valves are automatically operated so that a liquid flow path exists through the assembled fitting from the nipple into the hose. However, when the fitting parts are disconnected from each other, the valves are automatically closed so that no liquid may pass from the nipple to the exterior of the reel and so that no liquid may pass from the interior of the hose. Each fitting is also provided with a mechanism which is operable for quickly disconnecting the two fitting parts. This mechanism (not shown) is operated by pulling on a lanyard 54 secured to fitting part 52; the lanyard, when the two parts of the fitting are engaged, lies against the exterior of the reel drum and is accessible when hose 50 is fully payed-out from the reel.

A liquid flow fitting like that described is manufactured by Aeroquip Corporation, Aircraft Division, Jackson, Mich., and is identified by the manufacturer as a type 3750–20 coupling set.

If desired, liquid flow fitting 48 may be used to couple hoses 29 and 24 to fuel/defuel valve assembly 22, and to couple hose 23 between the pump/motor and filter/meter modules of the fuel/defuel system.

As shown in FIG. 7, a manually valved fuel nozzle 55 is connected to each hose 50 at the end of the hose opposite from fitting part 52. These nozzles preferably are over-wing aircraft fueling nozzles having a rated flowrate of 25 gallons per minute when open. In fueling aircraft, it is important that such nozzles not be used to discharge fuel at a rate greater than the rated flowrate of the nozzle. Accordingly, hose reel assembly includes means defining a predetermined rate, preferably 25 gallons per minute, of liquid flow from the liquid flow path in the frame ground engaging portion to each hose reel. This flow regulation is provided by a flow regulator 56 mounted in the length of each of pipes 37.

The hose reel assembly is connectible to hose 29 via an inlet duct 58 which is connected to one of pipes 37 below the flow regulator mounted in the pipe. The inlet duct terminates in a fitting 59 by which hose 29 may be coupled to the frame. All fuel introduced into the frame and not passed through the regulator mounted to the pipe to which the inlet duct is connected, moves along the flow path defined by the rectangular base of the frame to the other flow regulators.

From the foregoing, it is apparent that frame 31 provides the dual function of rotatably supporting the several hose reels and of providing a manifold or distribution system between a single liquid inlet to the assembly and several liquid outlets.

It is apparent that hose reel assembly 30 can be used to advantage with fuel/defuel apparatus 12 in land-based fueling installations, especially by the military where the compact size of the components of the apparatus and of the hose reel assembly adapts the structure to air transport. The hose reel assembly also enables a helicopter equipped with the fuel/defuel apparatus to function as a flying gas-station with hit-and-run capabilities. For example, in carrying out anti-guerilla warfare, it is not always known where or when it will be necessary to refuel trucks, jeeps and the like for most efficient use of such vehicles; it is not always desirable or possible to require the vehicles to return to a central established fueling facility. Where the present hose reel assembly is used, however, it is possible to have the trucks and other vehicles rendezvous with the helicopter tanker at any suitable place. Once the helicopter has landed, the fuel transfer hoses can be rapidly run-out the required distance from the helicopter to the several vehicles to be fueled and the fueling operation performed in a very short time.

Particularly in anti-guerilla warfare, it is possible that the helicopter may be attacked while on the ground carrying out fueling operations. In such an event, the helicopter may take off immediately, the run-out hoses being reeled into the helicopter to the hose reel assembly even as the helicopter is rising. Alternatively, the helicopter may take off with no attempt being made to recover the hoses. Instead the hoses are fully reeled out, preferably by gravity as the helicopter rises, and are disconnected from the hose reel assembly to be abandoned. Disconnection of the hoses from the hose reel assembly can be accomplished rapidly merely by pulling on lanyards 54 as soon as the hoses are fully uncoiled from the reels.

Figure 8:
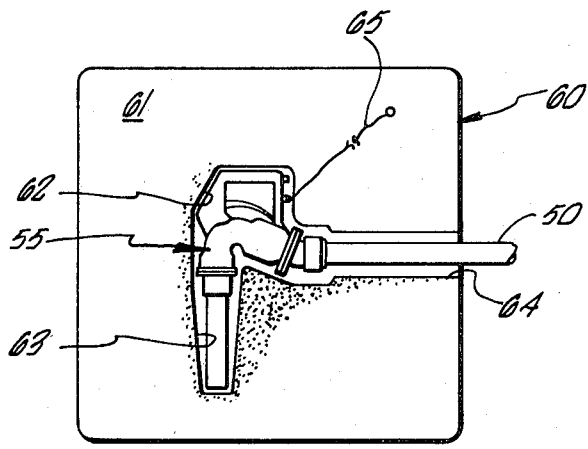
FIG. 8 is a top plan view of a hose nozzle and float therefor for use in paying out hose from the hose reel during waterborne fuel transfer operations like that illustrated in FIG. 1.

As noted above, prior to the present invention, it was not practical for the military to carry out vehicle fueling operations from a floating amphibious helicopter because of the problems attendant to paying-out the fuel transfer hoses from the helicopter to the vehicles to be fueled. This invention, as shown in FIG. 1, provides means for efficiently paying-out fuel transfer hose from a floating helicopter.

Where it is desired that fueling operations be carried out from a floating helicopter, each nozzle 55 is supported on a buoyant float member 60, shown best in FIG. 8. The float member preferably is fabricated from multicellular rigid plastic foam material such as polyurethane foam or polystyrene foam. The individual cells in the foam material are sealed from each other, thus the float member cannot become waterlogged in use. Preferably the exterior surfaces of the float member are further sealed with a moisture impervious coating. The float member has a substantially rectangular planform shape and has an upper surface 61 defining an upwardly open recess 62. The recess includes a portion 63 contoured to mate with and support nozzle 55 in a predetermined position on the float member. The recess also has a portion 64 extending from portion 63 to a side of the float member in which is disposed the portion of hose 50 adjacent the nozzle when the nozzle is engaged in recess portion 63. A tether cord 65 is connected between the nozzle and the float member to prevent the float member from becoming lost and also to prevent the nozzle and the float member from becoming completely separated should the float member be overturned while supporting the nozzle on the surface of a body of water in the latter instance, the float member serves as a buoy enabling rapid recovery of the nozzle from a floating vessel or vehicle to be fueled.

To pay-out a fuel transfer hose from a floating helicopter to another floating vessel or vehicle to be fueled, nozzle 55 is supported on a float member 60 and placed upon the surface of the water in the area of downwash from the helicopter rotors. The downwash blows the float member away from the helicopter a sufficient distance rearwardly of the helicopter that the vessel or vehicle to be fueled can safely approach the float and take on board the nozzle. Fuel transfer operations may be commenced substantially immediately thereafter. Hose is payed-out from reel assembly 30 as the float moves away from the helicopter by manually rotating the proper hose reel.

If during waterborne fueling operation, it becomes necessary for the tanker helicopter to depart immediately, the payed-out hose may be jettisoned in the manner described above. The jettisoned hose may be recovered at a later time, if desired. Recovery of the hose is possible since, at the time the hose is disconnected from its storage reel, valve 53 in fitting part 52 is operated to seal that end of the hose; the other end of the hose is sealed by nozzle 55. The gasoline retained in the hose and the float block provide sufficient buoyancy that the hose and nozzle float on the surface of the water.

Hose reel assembly 30 has been described above by reference to a fuel/defuel system in accord with U.S. Patent 3,169,667 and an amphibious helicopter merely to illustrate the utility of the hose reel assembly. The hose reel assembly may be used in conjunction with other liquid handling equipment where desired. Also, the number of hose reels included in the reel assembly may be varied as desired. Hose connector fittings other than those described may be used where quick disconnection of the hose from its reel is not required. Accordingly, it will be apparent to workers skilled in the art to which the present invention relates that modifications and alterations may be made in the abovedescribed structure without departing from the scope of this invention. The foregoing description has been presented merely by way of example, rather than limitation.

What is claimed is:
1. A hose reel assembly comprising:
(a) a plurality of hose reels each including a liquid flow fitting adapted to be coupled to a hose,
(b) a wheelless sled-type ground engaging reel supporting framework mounting the reels for rotation relative to each other and including means defining a liquid flow path communicating between an inlet to the path and each fitting, each fitting defining an outlet from the path, and
(c) flowrate control means for each outlet disposed in the flow path for limiting to a selected rate the flow of liquid to each outlet.

2. A hose reel assembly according to claim 1 wherein the reel supporting framework comprises a base having a ground engaging portion fabricated of hollow structural members the interiors of which define a portion of the liquid flow path and the inlet to said flow path opens to the interior of one of said structural members.

3. A hose reel assembly according to claim 2 wherein the reel support means includes a horizontal fixed duct extending axially of each reel, and rigid duct means mounting the fixed ducts above the base ground engaging portion and communicating the fixed ducts in liquid flow relation to the liquid flow path.

4. A hose reel assembly according to claim 1 wherein the plurality of reels includes a first reel and a second reel disposed adjacent each other in spaced coaxial alignment, each reel includes a hollow axial duct rotatable with the reel and having an open end and a closed end, the reel axial ducts being disposed so that their open ends are adjacent each other, and the reel support means includes means rotatably mounting the closed end of each reel axial duct, a fixed hollow sleeve defining a portion of said flow path rotatably disposed between the first and second reels and rotatably journalling the open end of an adjacent reel axial duct at each of its opposite ends, partition means in the sleeve dividing the interior of the sleeve into two oppositely opening chambers each communicating with the interior of the adjacent reel axial duct, and rigid duct means supporting the sleeve concentric to the axis of the first and second reels and defining a further portion of the flow path separately communicating the chambers with the flow path toward the inlet.

5. A hose reel assembly according to claim 4 wherein said flowrate control means are disposed in said rigid duct means.

6. A hose reel assembly according to claim 5 wherein the reel support means comprises a rectangular ground engaging frame fabricated of hollow tubular members having their interiors in communication with each other to define a portion of said liquid flow path, the inlet to said path, said rigid duct means comprises a pair of rigid duct members extending upwardly from opposite sides of the frame to the hollow sleeve, the duct member communicating the interior of the frame and the interior of the sleeve on opposite sides of the partition means.

7. The method of paying-out liquid transfer hose from a helicopter floating on a body of water to a vessel floating on the water adjacent the helicopter so that liquid may be transferred between the helicopter and the vessel through the hose, including the steps of
(a) operating the helicopter rotor to produce downwash therefrom around the helicopter to the surface of the body of water,
(b) supporting the end of the hose to be coupled to the vessel upon a buoyant float member,
(c) placing the float member with the hose end supported thereon on the surface of the water in the area of downwash so that the downwash blows the float member out of said area toward the vessel, and (d) paying-out hose from the helicopter as the float member moves away from the helicopter.

8. The method of running out a fuel transfer hose from a tanker helicopter floating on a body of water to a vessel to be fueled floating on the water adjacent the helicopter, the end of the hose to be connected to the vessel carrying a suitable liquid flow fitting, the method including the steps of (a) rotating the helicopter rotor to produce downwash therefrom around the helicopter to the surface of the water, (b) supporting the fitting and a portion of the hose adjacent the fitting on a buoyant float member, (c) placing the float member with the fitting supported thereon upon the surface of the water adjacent the helicopter in the area of downwash so that the downwash acts upon the float member to urge the float member away from the helicopter, and (d) paying-out the hose from the helicopter as the float member moves away from the helicopter.

References Cited

UNITED STATES PATENTS

| | | | |
|---|---|---|---|
| 1,177,206 | 3/1916 | Nemec | 137—355.12 |
| 1,746,995 | 2/1930 | Edwards | 137—355.17 |
| 2,096,225 | 10/1937 | Crawford | 137—355.12 XR |
| 2,383,840 | 8/1945 | Benckert | 114—5 XR |
| 2,501,333 | 3/1950 | House | 137—355.12 |
| 2,735,717 | 2/1956 | Harman | 137—355.17 XR |
| 2,839,314 | 6/1958 | Clark | 137—614.04 |
| 2,893,422 | 7/1959 | Schiltz | 137—355.20 XR |
| 2,971,528 | 2/1961 | Rocca | 137—355.12 |
| 3,130,749 | 4/1964 | Wittren | 137—614 |

FOREIGN PATENTS

| | | |
|---|---|---|
| 307,254 | 4/1933 | Italy. |
| 1,165,661 | 6/1958 | France. |

SAMUEL SCOTT, *Primary Examiner.*

U.S. Cl. X.R.

141—1